June 21, 1927.

O. A. HANFORD

METHOD OF COOLING MOLDS

Filed March 31, 1924

ANDREW J. SCHLERETH
ADMINISTRATOR OF
ORIN A. HANFORD
BY

*INVENTOR.*

*ATTORNEY.*

Patented June 21, 1927.

1,632,962

UNITED STATES PATENT OFFICE.

ORIN A. HANFORD, DECEASED, LATE OF COLUMBUS, OHIO; BY ANDREW J. SCHLERETH, ADMINISTRATOR, OF COLUMBUS, OHIO, ASSIGNOR TO THE FEDERAL GLASS COMPANY, OF COLUMBUS, OHIO, A CORPORATION OF OHIO.

METHOD OF COOLING MOLDS.

Application filed March 31, 1924. Serial No. 703,128.

This invention relates to glass forming apparatus and has to do particularly with the provision of novel method and apparatus for the blowing of glass blanks and the cooling of the glass blowing molds. It is particularly applicable to blown ware, being especially useful in combination with that type of machine wherein the glass blank is initially formed and positioned prior to the final blowing.

In the past, in cooling blow molds it has been the custom to dip the mold in a bath of liquid after each mold operation. The liquid of such a bath always becomes dirty and oily from constant use, with the result that harmful marks are produced in the blown ware. The damage produced by such dirt and oil in the cooling bath has been the cause of a very high percentage of waste in the making of high-grade blown ware of the type produced by the present invention.

This invention contemplates the elimination of all dirt and oil in the cooling of mold parts by an extremely simple and yet novel method, which consists in raising and lowering and opening and closing the mold parts to intermittently effect the blowing of the glass blank and automatically spraying the mold parts with a fresh cooling liquid when lowered from blowing position.

This novel method is preferably accomplished by the utilization of the operating mechanism of the apparatus for controlling the forming of the blank, which operating mechanism is effective to control the opening and closing of the mold parts, to pneumatically control the raising and lowering of the mold parts and to automatically effect the spraying of such molds by virtue of such pneumatic operation.

More specifically, this invention comprises the provision of pneumatic means preferably controllable by the operation of the glass-forming apparatus for controlling the movement of the mold parts to and from blowing position. This pneumatic controlling means is preferably balanced by suitable means to assist in the raising and lowering operation of the mold parts. The means for spraying such mold parts is preferably located at a position adjacent the mold parts when withdrawn from blowing position, with the result that the withdrawal of the mold parts from around the blown article will be effective in itself to cause the mold or mold parts to be sprayed and cooled.

The type of apparatus which it is preferred to use in the performance of this method is illustrated in the accompanying drawings, wherein similar characters of reference designate corresponding parts and wherein:

Figure 3 is a longitudinal section of the preferred form of valve structure for controlling the pneumatic raising and lowering of the blow mold.

Figure 4 is a side elevation of the structure shown in Figure 1, showing the positioning of the spraying means and operating means and also showing the mold in raised blowing position.

Figure 1:
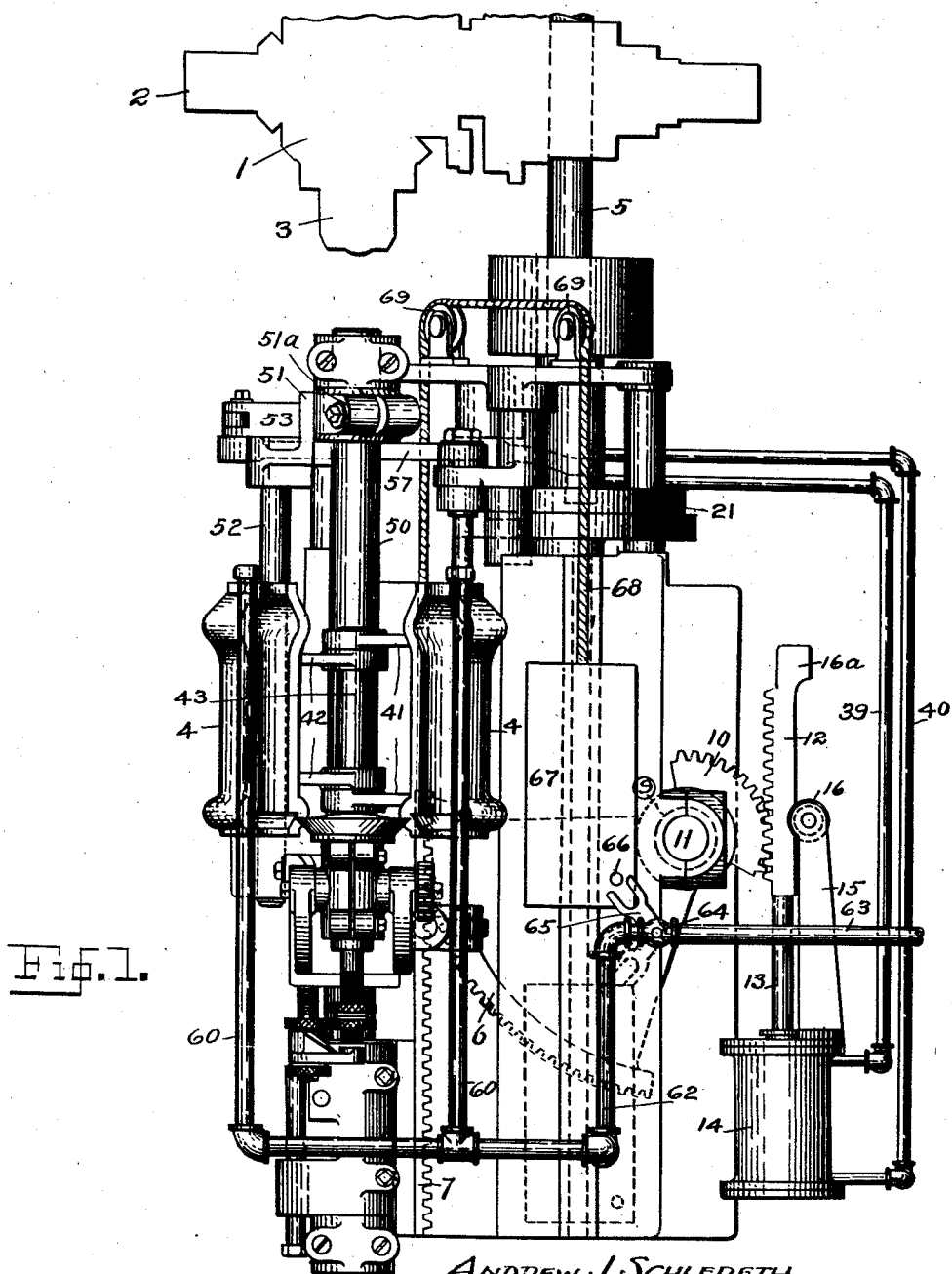
Figure 1 is a front elevation of the preferred form of the blow mold operating and cooling apparatus and showing the mold parts in lowered cooling position and also diagrammatically showing one type of blowing head for positioning the glass blank relative to the blowing mold.

In the drawings the glass-forming and mold cooling apparatus is shown as comprising a part of and being controlled by the operation of a single glass-forming unit, although it will be understood that the method and apparatus may be used with a plurality of complete glass-forming units. However, as the blowing and cooling method and apparatus can probably best be described by applying it to a single glass-forming unit, such apparatus is shown in combination with the blowing head of a single glass-forming unit which is diagrammatically shown and designated 1.

This blowing head is preferably designed to be rotated about a horizontal axis 2 and is preferably of the type wherein the glass blank is received and held in the head 3 while such blank is being initially formed prior to the final blowing thereof.

In Figure 1 the blowing head 3 is shown in a vertically downward position and in which position the glass blank is adapted to be held and possibly rotated prior to the enclosing thereof by the mold halves of a suitable blow mold 4. This blow mold and the mechanism for operating the same are supported by suitable frame structure which may form a part of the blowing head 1 and the complete forming unit or which may be independent thereof and merely located below said forming unit. It will be understood that the forming unit of which the blowing head and the blow mold and cooling mechanism is a part is preferably a stationary unit to which charges of glass may be delivered. This forming unit is preferably operated by a central source of power, which power is transmitted to a vertical shaft 5.

This shaft 5 is designed to be in operation when the forming unit and the blowing head 1 are in operation, and as best shown in Figure 5, such shaft preferably extends downwardly to form a part of and to constitute the operating or controlling means for effecting the operation and cooling of the blow mold, as will presently be described.

When the glass blank has been formed and is positioned ready for blowing, the blow mold 4 is designed to be raised to enclose such blank to complete the blowing operation and then lowered to permit the blown article to be removed or ejected from the blow head in any suitable manner. This raising and lowering of the blow mold 4 is effected by means of a gear sector 6 which engages a rack 7, which rack is mounted upon a reciprocable mold carrying bracket 8. The sector 6 is keyed to an extended hub 9 of the pinion sector 10 and which pinion is in turn carried by a stub shaft 11 mounted in the frame. The gear and pinion sectors 6 and 10 swing as a unit on the stub shaft 11.

The pinion sector 10 is designed to be pneumatically oscillated by means of a rack 12, which is preferably formed as a part of a piston rod 13, which forms a part of and extends downwardly into a vertically positioned cylinder 14 where it is connected to a piston in the ordinary manner. The upper head of the cylinder 14 is provided with an up-standing arm or arms 15 which act as supports for a flanged roller 16 journaled at the upper end thereof. This roller acts as a guide and brace for the operating rack 12. Furthermore, the roller 16 is designed to form a stop to contact with an extension 16ᵃ on the upper end of the rack 12 to limit the lowermost position of such rack.

The piston which raises and lowers the rack 12 for controlling the raising and lowering of the blow mold, is preferably operated by compressed air controlled by a valve 17. This valve 17 is positively moved in one direction by means of a cam lever 18, fulcrumed as at 19. This operating lever 18 is provided with a cam roll 20 which is designed to be resiliently held in contact with the periphery of a cam 21 by means of a spring 22 positioned between the end of the lever 18 and the valve 17. The cam 21 is mounted upon and rotated by the main operating shaft 5.

This valve 17, as best shown in Figure 3, comprises a piston rod extension 23, which is designed to be pivotally and slidably connected with the end of the operating lever 18. This extension 23 is reduced and is designed to be secured to a valve core 24 by means of a pin 25. A nipple 26 is threaded into the opposite end of a valve core 24 for the reception of a flexible air line 27. The valve core 24 is provided at a point approximately intermediate its ends with an annular groove 28, which is designed to alternately connect a port 29 of the air passage 30 and the port 31 of an air passage 32, to a common exhaust port 33 suitably located in the valve housing. The valve core 24 is further provided with ports 34 and 35, which alternately coincide with the ports 36 and 37 to admit air to the passages 32 and 30 respectively. In order to keep the ports 34 and 35 in proper alignment with the ports 36 and 37, an elongated key-way 38 is cut in the valve core to slidably engage a suitable key mounted in the valve housing.

Figure 2:
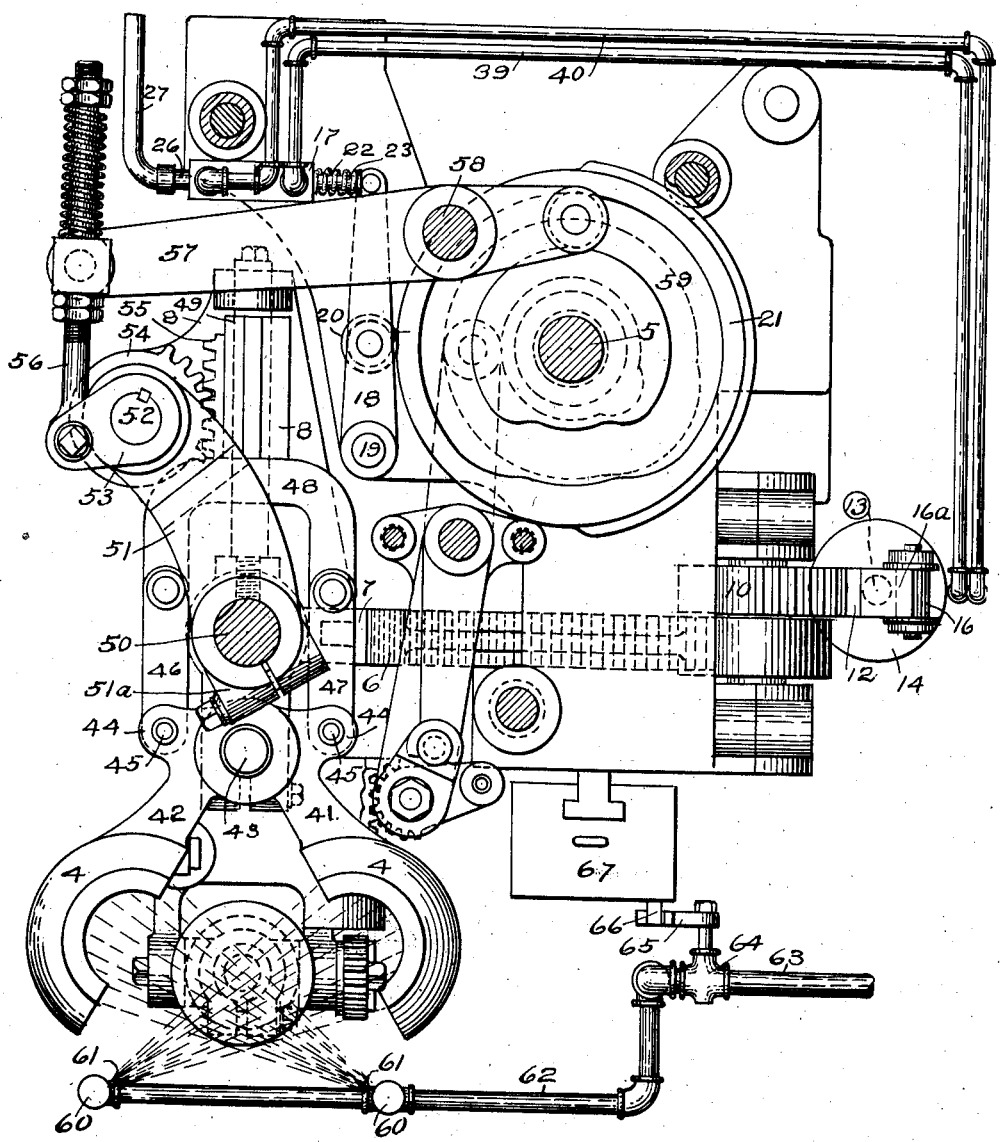
Figure 2 is a plan view of the structure shown in Figure 1 and showing in detail the main driving and actuating mechanism for opening and closing the molds, piston and connecting mechanism for raising and lowering the mold parts and the valve mechanism for controlling the operation of the piston structure.

The passage 30 is connected to the upper end of the cylinder 14 by means of an air line 39. The passage 32 is connected to the lower end of the cylinder 14 by an air line 40. It will be obvious that when the valve core is moved to the right by the spring 22 when the cam 21 is in position, as shown in Figure 2, compressed air will flow from the interior of the valve core 24, which is under constant pressure, through the ports 34 and 36 into the air passage 32 and then through the pipe 40 to the lower end of the cylinder 14. At the same time the annular groove 28 will have connected the port 29 to the exhaust port 33, thus allowing the air from the upper end of the cylinder to pass through the pipe 39 and thence through the exhaust port 33 to the atmosphere. Thus it will be further obvious that by this action of the valve, the rack 12 will be moved upwards to effect the lowering of the mold 4. When the cam 21 has rotated to the point where the valve core is moved to the left, it will be obvious that the above action is reversed and the mold 4 raised to blowing position.

In the operation of the invention the mold parts are preferably opened and closed at certain predetermined positions during both the raising and lowering operation. This mold opening and closing mechanism is best shown in Figure 2 and comprises in combination with the mold halves 4 integral arms 41 and 42, which are pivotally mounted upon a shaft 43. These arms are provided with apertured lugs 44 and 45, which are in turn pivotally connected to links 46 and 47. These links are in turn pivoted to a suitable yoke 48 which is slidably mounted upon a guide 49, which is in turn carried by the mold supporting bracket 8.

This general mold supporting bracket 8 is slidably mounted upon a vertical post 50 which carries adjacent its upper end an arcuate bracket 51 clamped thereto as at 51ª. A shaft 52 is journaled in the bracket 51 and carries in its upper end an arm 53 keyed thereto. This shaft 52 passes downwardly through the mold supporting bracket 8, which in turn is designed to carry a gear sector 54 in a suitable housing. The gear sector 54 is slidably keyed to the shaft 52 and is designed to engage a rack 55 secured to the side of the yoke 48. The arm 53 is operative to swing the two arms 41 and 42 to open and close the mold section by means of a pivoted rod 56 having a spring cushion connection with one end of a cam lever 57. This cam lever is fulcrumed at 58 and is provided at its opposite end with a roller working in a groove 59 formed in the top part of the cam 21 mounted upon the main operating shaft 5. It will be understood that the cam bearing the groove 59 may be separate from the cam which actuates the lever arm 18 so that the two cams may be relatively adjusted with relation to each other and to the shaft 5, so that the opening and closing and time of such opening and closing of the molds may be adjusted. It will be obvious from the above structure that the mold bracket 8 and the mold opening structure is movable vertically and simultaneously with the raising and lowering of the blow mold structure whereby the operation of the lever 56 is effective at any time to open or close the mold.

The apparatus for cooling the mold comprises up-standing pipes 60, perforated as at 61, which are suitably located, as best shown in Figure 2, in front of the divided mold sections 4 when in lowered position, as shown in Figure 1. These perforated pipes 60 are so diagonally disposed relative to the open mold sections, that any jets of water or other fluid from each pipe 60 will strike the interior of the respective mold halves in such a manner as to effectively spray the entire inner surface of the mold. The pipes 60 are preferably connected by means of a pipe 62 to a common liquid supply pipe 63.

Interposed between the pipes 62 and 63 is a valve 64 provided with a bifurcated arm 65 designed to engage and be operated by an operating pin 66 mounted upon a counterbalance 67. This counterbalance 67 is connected to the upper end of the rack 7 by means of a suitable cable 68 which fastens over pulleys 69 mounted upon the frame. It will be obvious that this counterbalance opposes or helps the action of the piston rod 13 and that any vertical movement of the mold frame will cause an equal opposite vertical movement of the counterbalance 67. This counterbalance is designed to steady and help the action of the mold raising and lowering.

It will be seen that when the mold 4 is lowered from blowing to cooling position, as shown in Figure 1, the counterbalance 67 will be raised from the dotted line position to the full line position as shown in this figure, and the pin 66 carried thereby will enter between the fingers of the bifurcated arm 65. After entering between the fingers of the arm 65, further movement of the pin will rotate the arm from its dotted line to its full line position, whereby the valve 64 will be opened admitting the cooling fluid from the supply pipe 63 to the up-standing spray pipes 60. This spraying of the mold will be continued until the mold is raised toward blowing position, when the pin 66 will again rotate the arm 65 to its downwardly extending position to close the valve 64.

In operation, assuming that a charge of glass has been delivered to and formed by the forming mechanism, the rotation of the shaft 5 will be effective to raise the mold 4 to a position adjacent the suspended parison of blank and to close the mold around such parison for blowing. At the proper instant the cam groove 59 through the connecting mechanism will withdraw the yoke 48 and open the mold halves for removal of the ware. The cam 21 revolving as a part of or in unison with the cam containing the groove 59 will allow the valve core 24 to be moved to the right, when compressed air will be admitted to the lower end of the cylinder 14, thus forcing the piston rod 13 upward. This separate motion of the piston and piston rod will lower the mold 4 to the action of the gear sectors 10 and 6 and the rack 7 secured to the mold bracket. This downward movement of the mold will cause the counterbalance 67 to be raised, whereby the valve 64 will be raised and opened to permit cooling fluid to pass to and be ejected from the pipes 60 upon the inner surface of the opened mold halves. The mold core remains in position subject to this cooling spray until the continued rotation of the shaft 5 will rotate the cam 21 to cause the valve core 24 to be moved to the left. This movement of the valve core will cause admission of compressed air to the upper end of the cylinder 14 whereby the mold will be moved upward to blowing position and the counterbalance lowered to effect closing of the valve 64. A parison may then be positioned between the raised and opened mold halves, when continued rotation of the shaft 5 will move the arm 57 to again effect closing of the mold halves for subsequent blowing of the parison.

It will be seen that this invention provides an extremely simple but positive acting device for intermittently cooling and spraying mold parts without subjecting such parts to oil, dirt or other foreign material. It will further be obvious that this invention also provides a novel mold operating mechanism, which mechanism is preferably designed to be controlled in timed relation to the operation of the blank forming mechanism and which apparatus is effective to correctly and automatically control the opening and closing of the mold halves in any position and is also effective to adjustably and pneumatically raise and lower the mold halves independently or simultaneously with the opening and closing thereof.

Having thus described this invention, what is claimed is:

The method of cooling blow molds in the making of glassware which comprises lowering the mold from blowing to inoperative position, spraying the mold with a cooling fluid and raising the mold to blowing position to stop the spraying action.

In testimony whereof I hereby affix my signature.

ANDREW J. SCHLERETH,
*Administrator of the Estate of Orin A. Hanford, Deceased.*